Feb. 17, 1931.  H. L. BARTON  1,792,565
BEARINGS AND METHOD OF MAKING THEM
Original Filed Dec. 12, 1925   5 Sheets-Sheet 1

Inventor
Henry L. Barton
By Blackmore, Spencer & Phill
Attorneys

Feb. 17, 1931. H. L. BARTON 1,792,565
BEARINGS AND METHOD OF MAKING THEM
Original Filed Dec. 12, 1925 5 Sheets-Sheet 2

Inventor
Henry L. Barton
By Blackmore, Spencer & Flint
Attorneys

Feb. 17, 1931.  H. L. BARTON  1,792,565
BEARINGS AND METHOD OF MAKING THEM
Original Filed Dec. 12, 1925  5 Sheets-Sheet 3

Inventor
Henry L. Barton
By
Attorneys

Feb. 17, 1931.  H. L. BARTON  1,792,565
BEARINGS AND METHOD OF MAKING THEM
Original Filed Dec. 12, 1925   5 Sheets-Sheet 4

Inventor
Henry L. Barton
By Blackmore, Spencer & Fluit
Attorneys

Feb. 17, 1931.   H. L. BARTON   1,792,565
BEARINGS AND METHOD OF MAKING THEM
Original Filed Dec. 12, 1925   5 Sheets-Sheet 5

Inventor
Henry L. Barton
By Blackmore, Spencer & Fleit,
Attorneys

Patented Feb. 17, 1931 1,792,565

UNITED STATES PATENT OFFICE

HENRY L. BARTON, OF DETROIT, MICHIGAN, ASSIGNOR, BY MESNE ASSIGNMENTS, TO GENERAL MOTORS RESEARCH CORPORATION, OF DETROIT, MICHIGAN, A CORPORATION OF DELAWARE

BEARINGS AND METHOD OF MAKING THEM

Application filed December 12, 1925, Serial No. 75,078. Renewed December 1, 1930.

This invention relates to bearings of the type used in automobiles to receive the journals of the crankshaft and similar rotating parts. These bearings are provided with a lining of soft metal, usually a Babbitt alloy, to reduce friction. In the manufacture of such bearings it has been found difficult to secure a good bond between the lining and the metal of the back, and, as a result, the percentage of bearings which had to be rejected because of defects in bonding was very high. Furthermore, many of the bearings which were sufficiently good to pass inspection were found to possess so imperfect a bond as to present the possibility of separation of bearing and back and also interfere with the proper conduction of heat away from the bearing surface with the result that the bearing would become very hot rendering lubrication ineffective. Thus a microscopic examination of a number of approved bearings produced by the current method of casting the babbitt in the back has revealed that the back and lining were bonded at widely separated points only.

Not only have bearings produced by prior processes frequently been found to be defective but the methods of making them have been very complicated involving a great number of expensive machining operations and entailing a great waste of materials.

I have devised a method of making bearings which is very simple and by which bearings can be produced with a minimum of scrap. A bearing produced by my method is marked by a dense molecular structure enabling it to more effectively resist wear and by the very good bond which exists between the soft bearing metal and the back, giving very good heat conductivity.

My method consists in applying soft bearing metal to the back by the use of very great pressure, say of the order of 125,000 pounds per square inch. This results in spreading the metal uniformly over the back and causing it to unite with the back which has preferably been given a preliminary treatment, as by tinning, to facilitate bonding. In case it is found desirable or necessary to use a press of smaller capacity I may apply heat to the bearing while undergoing the babbitting operation, this preferably being done by imbedding electrical resistance elements in the die and plunger. The degree of heat used should be less than that required to melt the babbitt or the tin where tinning is used, as the use of heat is merely auxiliary to the use of pressure. Where heat is used I have found pressures in the neighborhood of 70,000 pounds per square inch in combination with temperatures in the neighborhood of 350° F. to produce satisfactory results. I have also used pressure as low as 50,000 pounds per square inch and as high as 100,000 pounds per square inch and temperatures as low as 200° F. with good success.

The resulting bond between the metals has been found to be much superior to that produced by previous methods for while bearings lined by prior processes have been found to possess a good bond at widely separated points only, bearings produced by my process have been found to possess a good bond over substantially the entire area of contact of the metals. Thus the possibility of the bearing metal separating from the back is greatly reduced, a good bearing surface is insured over the entire area of the back, and the structure of the bearing is such that heat is rapidly conducted away from the bearing surface.

My process is capable of many modifications in detail, but the manner in which I prefer to carry it out is as follows: A blank is cut from flat stock, such as sheet steel, brass, or bronze. This blank is formed to the shape of a bearing segment in a suitable press. This operation may be performed in two steps, first, a preliminary bending and then a bending to final radius. The last operation includes a blow upon a portion of the blank to insure its set in final form. This pressing or stamping operation is preferably carried to the point where the blank assumes final dimensions not only as to interior and exterior diameters but at the parting line as well. This can best be done by using blanks of a particular weight as in coining operations. However, if preferred, the press may be used for producing the desired curvature only and a separate broaching operation may be employed to shape the parting line. The blank thus formed is tinned and placed in a die in a press and the exact amount of powdered babbitt required for the bearing is placed in it. While a mixture of powdered Babbitt ingredients may be used and the pressure relied upon to alloy the mixture as well as secure it to the bearing back, I have secured better results by the use of finely comminuted Babbitt alloy, the comminution preferably being done by atomizing babbitt while in a molten state. The die is of such shape as to prevent the escape of the babbitt when the plunger is brought down so that the alloy is spread in a thin layer over the surface of the bearing and formed into a dense homogeneous structure well bonded to the back. At the same time the heavy pressure produces a densification of the metal of the back. This operation also results in forming the bearing to finished interior dimensions so that it is now ready for use. However, if desired, finish interior broaching or machining and exterior grinding operations may be employed.

It will be noted that the above process involves but two essential operations, shaping the blank and pressing the babbitt into the blank. In addition, there may be not to exceed three or four finish machining operations. This is to be contrasted with the fifteen or more operations required by former processes. The only waste of materials in my process is that involved in the finish machining operations and is very slight compared with the waste involved in the many rough shaping as well as finishing operations employed in present practices. By my process the very considerable waste resulting from rejection of imperfect bearings is also practically eliminated.

It must be apparent that this process is capable of many modifications; thus the bearing back need not be formed of flat metal stock as described, but may be formed in any other desired manner. The back may, if desired, be provided with grooves or the like so as to effect a mechanical interlocking of the back and lining in addition to the bonding previously mentioned. The babbitt used for the lining may be solid, powdered, or a mixture of powdered Babbitt ingredients, although I have had the greatest success when using powdered pig babbitt as described. When a mixture of powdered Babbitt ingredients is employed it may also be desirable to heat the bearing after being pressed to perfect the alloy. In some cases tinning of the blank may be dispensed with, although I have found tinning to be very desirable for the production of a good bond with the pressures which I have used.

It may be found desirable in some cases to provide relief passages in the die or plunger to receive excess metal as is customary in drop forging. In such event a separate cutting operation must be employed to remove the excess metal.

When the machining operations are considered desirable after the babbitting, and a steel back is used, I have found it convenient to mount the bearing on a magnetic mandrel for outside turning or grinding. Various other modifications will occur to the reader in the course of the following description.

Referring now to the drawings.

Figure 1:
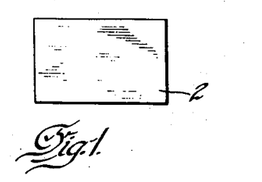
Figure 1 is a view of the blank from which the bearing back is made.

In so far as my method of babbitting is concerned it is immaterial how the back be manufactured, thus it may consist of a portion of a cast tubular blank machined to proper shape, or the back may be an integral part of a connecting rod where the die is of proper shape to receive it. However, I prefer to form the back from a blank 2 such as shown in Figure 1. This blank may be of steel, brass, bronze, or any other suitable material. However, for convenience in handling as well as for cheapness and superior wearing qualities, I have preferred to use a blank of steel. The blank is severed from a suitable sheet of material and for most accurate results I have preferred to use only blanks of a predetermined weight.

Figure 2:
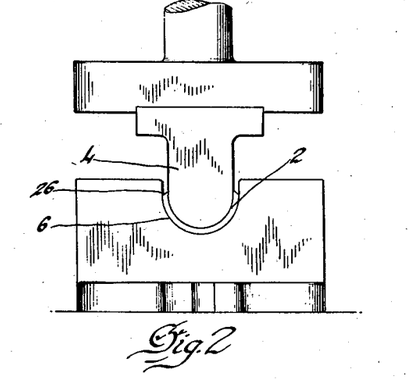
Figures 2 and 3 are somewhat diagrammatic views showing the steps in the shaping of the blank.

This blank is placed in a press, shown in Figure 2, in which it is subjected to a preliminary bending operation, the plunger 4 forcing the blank into die 6. The blank is preferably so selected that the flow lines of the metal follow the curvature of the blank.

Figure 3:
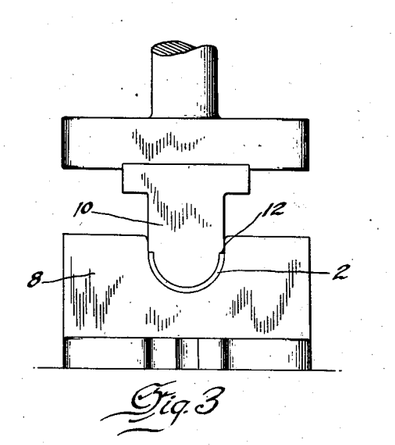

The blank will tend to spring back after this preliminary bending and to insure its set in the desired shape I have subjected the blank to a second bending operation illustrated in Figure 3. In this figure the reference character 8 indicates the die and the reference character 10 the plunger. The plunger is provided with shoulders 12 which engage the edges or parting line of the partly formed blank 2 when the plunger is forced home. The shoulders exert a sufficient blow upon the blank to effectively set it in finished shape so that no subsequent machining of the blank is required. The die is illustrated as open at its ends permitting the metal to be forced out at the ends as a result of the pressure. This makes it necessary to employ a straddle mill operation to reduce the blank to proper length. The blank shaping operation may be greatly facilitated by the provision of a blank of predetermined weight, the die in such case being preferably closed on all sides after the manner of the die shown in Figures 9 to 13, so that the flow of metal must take place within a cavity of predetermined volume. By using blanks of a given weight the metal is properly distributed throughout the cavity causing the blank to assume finished form and dimensions and at the same time effecting a very desirable densification of the molecular structure.

Figure 4:
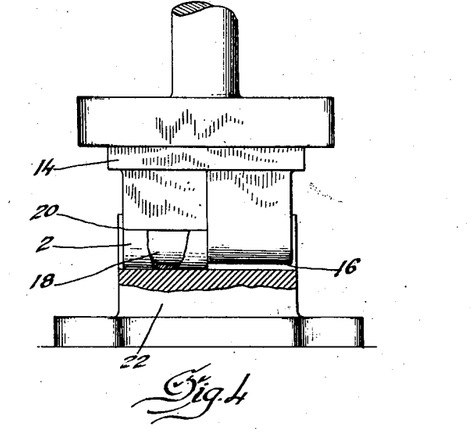
Figure 4 is a view, also somewhat diagrammatic, of a two-stage press which may be used to perform the operations shown in Figures 2 and 3.

In Figure 4 I have illustrated somewhat diagrammatically a two-stage press which may be used for the operations illustrated in Figures 2 and 3. In this case the plunger 14 is provided with a die portion 16 for the preliminary bending and a die portion 18 for the final bending, the portion 18 being provided with shoulders 20 for the purpose previously described. These die portions cooperate with the cavity in the die 22.

Figure 5:
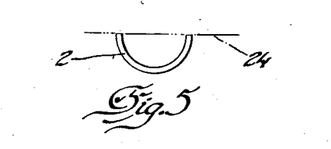
Figure 5 is an end view of the formed blank.

Figure 5 is an end view of the formed bearing blank. It will be noted that the parting line indicated by the dotted line 24 coincides with a diameter of the bearing, a result produced by the action of the shoulders 12 upon the edges of the blank, the shape of which, prior to this operation, being shown in exaggerated form at 26 in Figure 2. If shims are to be used, the parts of the die may be so designed that the parting line is parallel to a diameter instead of coincident with it.

Figure 6:
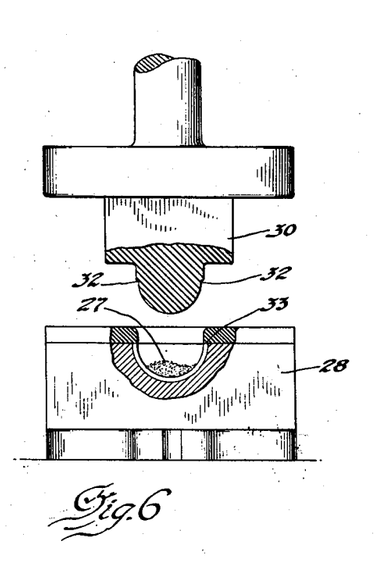
Figures 6 and 7 are diagrammatic views illustrating the method of applying the Babbitt lining to the back.
Figure 7:
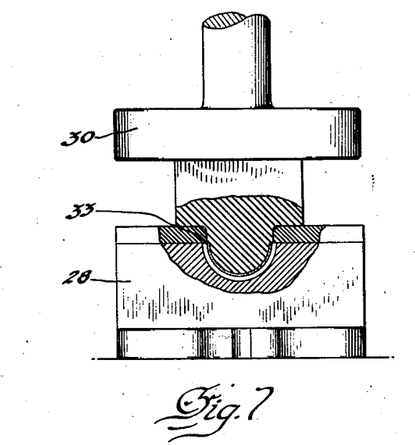

Figures 6 and 7 illustrate diagrammatically the babbitting operation. In these figures, 28 is the die and 30 the plunger provided with shoulders 32 for forming the parting line of the Babbitt lining. The die is shaped to conform exactly to the outside dimensions of the finished blank and as illustrated in Figures 9 to 13, confines the blank on all sides. As shown in Figures 6 and 7, the die is provided with shoulders 33 closely fitting the blank at the parting line to prevent the babbitt from spreading out over the ends of the blank. In general, the babbitting operation consists in placing a predetermined quantity of babbitt in the back and subjecting it to very high pressure to cause it to unite with the back forming a compact wear resisting lining. In detail, I have found it best to tin the blank before the babbitting operation in order to insure a very good bond. If desired, the interior of the back may be grooved or otherwise roughened so as to effect a mechanical interlock between the babbitt and the back. However, I have found tinning alone to be very satisfactory. Where the term "tinning" is used in the claims it is of course to be understood to include any metal or substance used in effecting the bonding of the lining and back.

Considerable variation is also permissible in the selection of bearing material. I have secured best results by the use of pig babbitt finely comminuted by atomizing it while in a molten state. However, if preferred, a mixture of powdered Babbitt ingredients may be employed, the pressure being relied upon to effect the alloying of the metals as well as the bonding of the lining to the back. While good bearings may be produced by the use of powdered ingredients it has been found difficult to secure a good alloy over the entire surface of the bearing. In some cases the solid Babbitt metal may also be found satisfactory.

While I have preferred to use as the soft bearing metal one of the well known Babbitt alloys, it is to be understood that various metals and alloys suitable for lining bearings may be employed.

In the operation of the process as I have preferred to carry it out a measured quantity 27 of powdered pig babbitt is placed in the back which is positioned in the die 28, the plunger 30 is forced home resulting in spreading of the babbitt in an even layer over the entire surface of the bearing and producing a very good bond between the babbitt and the tinned back.

Figure 8:
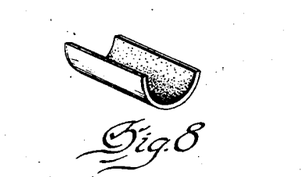
Figure 8 is a perspective view showing the finished bearing.
Figure 9:
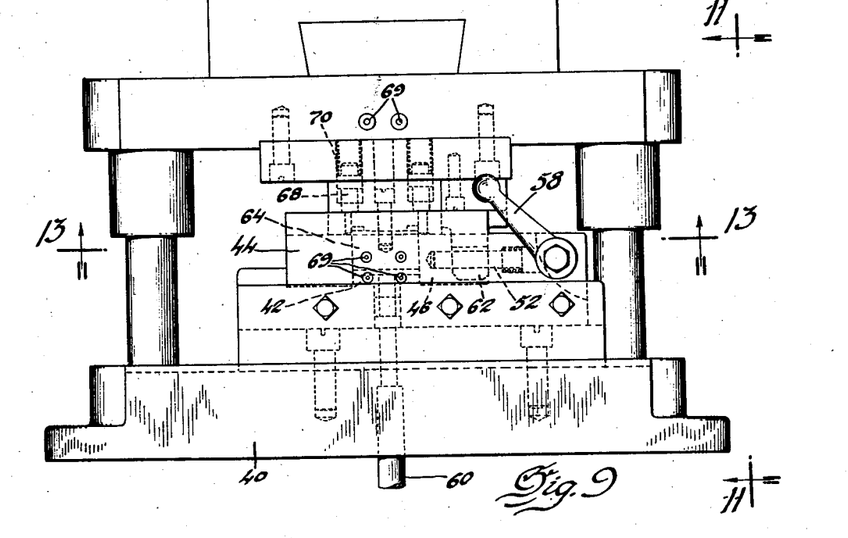
Figure 9 is a side elevation of the press employed in the babbitting operation.
Figure 10:
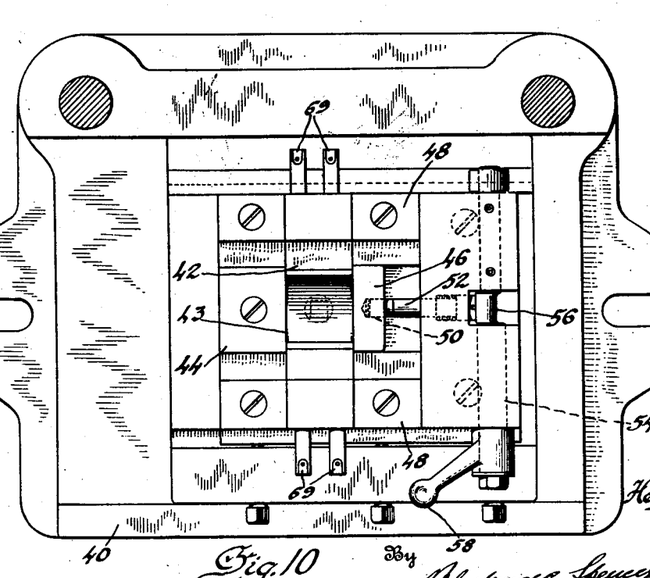
Figure 10 is a view showing the die or bed portion of the press.
Figure 11:
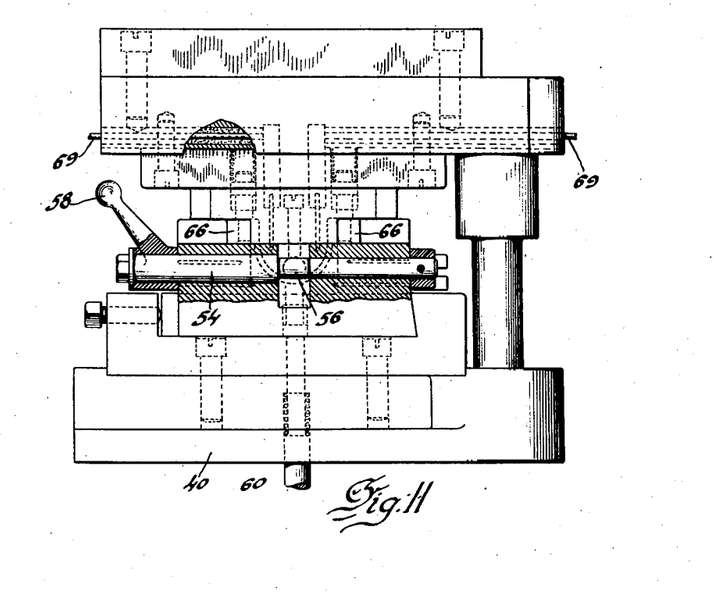
Figure 11 is a view taken on line 11—11 of Figure 9.
Figure 12:
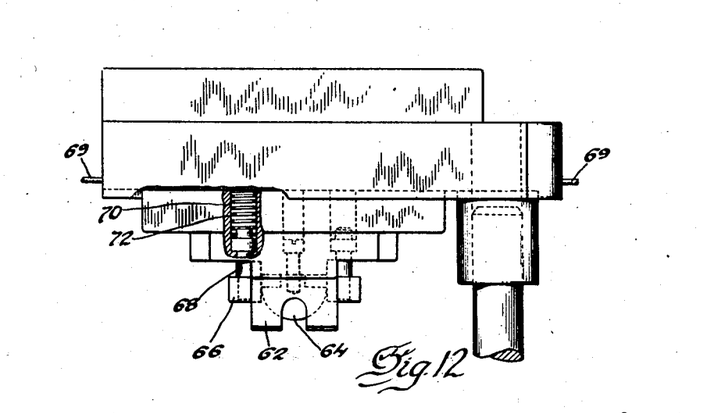
Figure 12 is a view in elevation of the plunger portion of the press.
Figure 13:
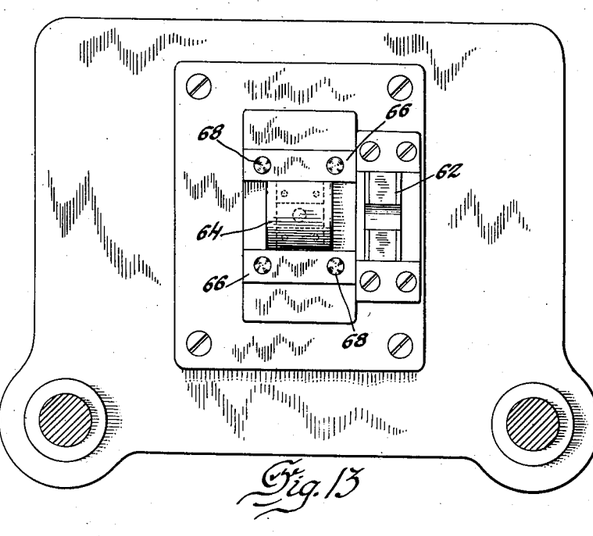
Figure 13 is a view of the plunger portion of the press taken on line 13—13 of Figure 9.

Figure 8 illustrates a bearing made by my process. The shaping operations performed on the blank gave to it substantially finished dimensions throughout. However, if extreme accuracy is essential it may be necessary to broach or trim the parting line and in some cases to subject the outside of the blank to a slight grinding or other finishing operation. However, for most purposes the bearing back assumes substantially finished dimensions as a result of the original forming and at the same time the molecular structure of the blank is greatly densified. It will be noted that this blank was also so selected that the flow lines of the metal follow the curvature of the blank thus reducing the possibility of fracturing the metal. The babbitt has been applied to the finished blank with such great pressure as to produce a very good bond between the lining and back over the entire surface of contact as contrasted with a bond at more or less isolated spots which is the best that can be produced by present processes. As a result the heat conductivity at the area of contact or "joint" between the metals is rendered very high and indeed actual test has shown this conductivity to be as great as that through the metals themselves. The tremendous pressure used in the babbitting operation also results in the production of a very hard glassy bearing surface and in the densification of the Babbitt lining and also, to a slight extent perhaps, in a further densification of the bearing back.

The babbitting operation is capable of some modification. As previously stated, it may be desirable to apply heat to the die to facilitate the forming operation, temperatures around 350° being used in combination with pressures in the neighborhood of 70,000 pounds per square inch. In any event the application of heat is merely auxiliary to the use of pressure and the degree of heat should be less than that required for the melting of the tin or babbitt as this process is to be clearly distinguished from die casting or similar methods in which the metals are treated in a molten condition. If desired, also the plunger portion of the press may be provided with ribs or projections to form the customary oil grooves and apertures in the bearing and in some cases with relief grooves as in die casting although this latter is objectionable in that subsequent trimming of the blank is made necessary.

Figures 9 to 13 illustrate a special press which has been developed for the babbitting operation. In these figures, 40 indicates the bed plate on which the die is secured. This die consists essentially of a block 42 having a semi-cylindrical cavity 43 therein of the exact shape of the bearing back. One end of this semi-cylindrical cavity is closed by means of a block 44 fixed to the bed plate while the other end is closed by a sliding block 46 operating in a guideway between two fixed blocks 48. The sliding block 46 is provided with a cavity 50 to receive one end of a spring retracted plunger 52 operated by means of a shaft 54 having an eccentric 56 thereon and provided with an operating handle 58. In one position of the handle 58 the sliding block 46 is held firmly in position by the plunger 52 to close one end of the die cavity and in the other position of the handle 58 the plunger is retracted relieving the block of pressure so as to facilitate the ejection of the finished bearing from the die by the operation of the knockout rod 60. If the block 46 were fixed the heavy pressure exerted might result in wedging the bearing segment in the die cavity so that upon operation of the knockout rod 60 the bearing segment would be subjected to some distortion. By the means described this difficulty is obviated.

I have preferably provided means in connection with the plunger portion of my die to prevent forcing of the sliding block 46 out of position during the operative portion of the stroke of the plunger. This means preferably consists of a forked stop member 62 secured to the plunger portion of the press and adapted to straddle the part 52 and engage the end of the sliding block 46 to prevent its being forced out of position upon the down stroke of the plunger.

The plunger portion of the press comprises the usual part 64 which engages the babbitt and forms it to the required shape. The plunger portion also carries blocks 66 provided with studs 68 having their upper ends guided in cavities 70 formed in the plunger portion and containing springs 72 adapted to react against an enlargement formed on the part 68 to yieldingly force the blocks in a downward direction. The blocks 66 engage the bearing segment at the parting line before the part 64 exerts appreciable pressure upon the babbitt and as the plunger is forced further down springs 72 are compressed and an effective seal is provided between the blocks 66 and the edges of the segment, thus preventing any of the babbitt from being forced onto the parting line.

It will be apparent that the die is so arranged as to enclose the bearing on all sides. The segment is a "bearing fit" in the cavity 43 in block 42. One end of the cavity is closed by fixed block 44, the other end being closed by sliding block 46. Blocks 66 cover the parting line of the blank. When the plunger portion 64 is forced home the babbitt is of necessity compressed into a thin layer evenly spread over the interior of the blank. The reference character 69 indicates resistance elements which may be provided in the die and plunger for heating the parts when desired.

Figure 14:
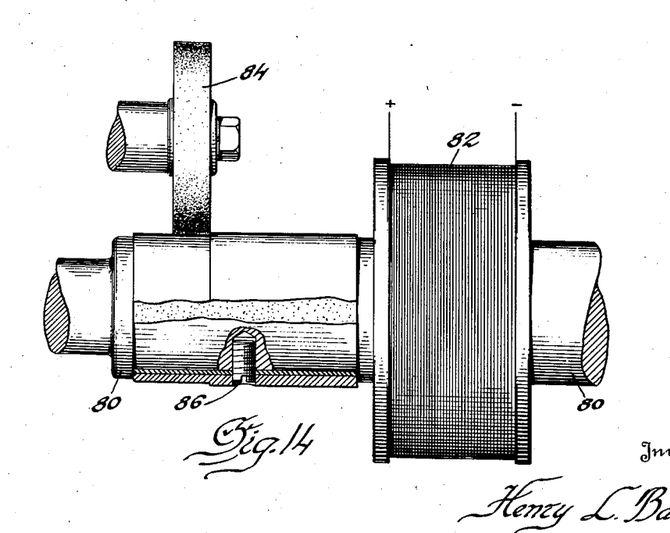
Figure 14 is a view of a magnetic mandrel which may be used where a finishing operation is required in producing very accurately sized bearings.

While as previously stated the bearing is now finished for all practical purposes, yet if extreme accuracy is desired the blank may be broached interiorly and subjected to outside machining. If preferred, the exterior machining may be done prior to the babbitting operation. I have illustrated in Figure 14 a special magnetic mandrel which may be used for the exterior finishing operation where a steel back bearing is produced. This mandrel consists essentially of a shaft 80 of magnetic material of a size to receive a pair of finished blanks or bearing segments. Upon the shaft is mounted an electromagnet 82 which may be energized from any suitable source to hold the bearing parts securely upon the shaft. I have shown at 84 a conventional grinding wheel which may be used for the finishing operation. If desired, any suitable means such as a pin or screw bolt 86 may be used to prevent rotation of the segments about the shaft during the grinding but I have found in actual practice that this is unnecessary.

I claim:

1. A bearing consisting of a bearing back and a lining of soft bearing metal secured thereto in good heat conducting relation, said lining having a dense homogeneous structure produced by the union of finely divided particles of bearing metal with each other and with the bearing back under very high pressure.

2. A bearing consisting of a bearing back, a coating of tin on said back and a layer of babbitt overlying said tin, said layer being composed of finely divided particles of babbitt secured to the back in good heat conducting relation by means of heavy pressure.

3. A bearing consisting of a back pressed out of sheet metal having a coating of tin thereon, and a lining of babbitt overlying the tin, said lining consisting of finely divided particles of powdered Babbitt alloy secured to the back in good heat conducting relation by heavy pressure.

4. The method of making a bearing which consists in providing a bearing back, placing a quantity of powdered bearing metal in the back and applying pressure to the powder to cause it to unite with the back in good heat conducting relation.

5. The method of making a bearing which consists in providing a bearing back, tinning the back, placing the back in a suitable die, putting a quantity of powdered bearing metal in the back and applying heavy pressure to the metal to cause it to unite with the back in good heat conducting relation.

6. The method of making a bearing which consists in providing a bearing back, tinning the back, placing the back in a suitable die which is closed on all sides, placing a quantity of powdered babbitt in the back, and applying pressure to the babbitt to cause it to unite with the back in good heat conducting relation and to cause the bearing to assume substantially finished dimensions.

7. The method of making a bearing which consists in providing a bearing back, tinning the back, placing the back in a suitable die which is enclosed on all sides, putting the exact amount of powdered soft bearing metal in the back which it is desired to secure thereto, and applying pressure to the metal to cause it to unite with the back in good heat conducting relation, and to cause the bearing to assume finished dimensions.

8. The method of producing a Babbitt lined bearing which consists in taking a bearing back, tinning the back, placing the back in a suitable die, placing in the back a quantity of powdered Babbitt alloy and applying pressure to the babbitt to cause it to unite with the back in good heat conducting relation.

9. The method of producing a Babbitt lined bearing which consists in taking a bearing back, tinning the back, placing the back in a suitable die substantially closed on all sides, putting in the back the exact amount of powdered Babbitt alloy which it is desired to secure to the back, and applying pressure to the Babbitt alloy to cause it to unite with the back in good heat conducting relation, and to cause the bearing to assume substantially finished dimensions.

10. The method of making a lined bearing which consists in placing a bearing back in a die substantially closed on all sides, placing in the die the exact amount of soft bearing metal which it is desired to secure to the back, and applying heavy pressure to the soft bearing metal to secure it to the back in good heat conducting relation.

11. The method of making lined bearings which consists in tinning a bearing back, placing it in a die which is substantially closed on all sides, placing in the back the exact amount of babbitt which it is desired to secure to the back, and applying pressure to the babbitt to secure it to the back in good heat conducting relation.

12. The method of making a bearing which consists in taking a suitably shaped blank, pressing it to substantially finished dimensions, tinning the formed blank, placing the formed blank in a suitable die, putting a quantity of powdered babbitt in the die, and applying a high degree of pressure to the babbitt to cause it to unite with the back in good heat conducting relation.

13. The method of making a bearing which consists in taking a suitably shaped blank, pressing it to substantially finished dimensions, tinning the formed blank, placing the formed blank in a suitable die, putting in the formed blank the exact amount of powdered Babbitt alloy which it is desired to secure to the back and applying pressure to the babbitt to cause it to adhere to the back in good heat conducting relation and to cause the bearing to assume finished interior dimensions.

14. A bearing comprising a tinned steel back having a lining of soft bearing metal secured thereto, said bearing metal being in the form of finely comminuted particles secured to the back in good heat conducting relation by means of heavy pressure.

15. The method of making a bearing which consists in taking a back of predetermined weight, placing it in a die substantially closed on all sides and subjecting it to heavy pressure to form it to the exact shape and dimensions desired, placing a predetermined quantity of finely comminuted bearing metal in the back and pressing it to cause it to adhere to the back and to assume substantially finished shape and dimensions.

16. The method of making a bearing back which consists in taking a back of predetermined weight, placing it in a die substantially closed on all sides and subjecting it to heavy pressure to form it to the exact shape and dimensions desired, tinning the back and placing a predetermined quantity of finely comminuted pig Babbitt metal in the back and coin pressing it to cause it to unite with the back in good heat conducting relation and to assume substantially finished shape and dimensions.

In testimony whereof I affix my signature.

HENRY L. BARTON.